United States Patent [19]
Suzuki et al.

[11] Patent Number: 5,769,544
[45] Date of Patent: Jun. 23, 1998

[54] DYNAMIC PRESSURE PNEUMATIC BEARING DEVICE AND MANUFACTURING METHOD THEREOF

[75] Inventors: Mitsuo Suzuki; Yukio Itami, both of Yokohama; Kunio Ikeda, Chigasaki; Yuzuru Kudo, Atsugi; Takao Abe, Miyagi-ken; Yoshihiro Takahashi, Miyagi-ken; Kiyoshi Shibuya, Miyagi-ken, all of Japan

[73] Assignees: Ricoh Company, Ltd., Tokyo; Tohoku Ricoh Co., Ltd., Miyagi-ken, both of Japan

[21] Appl. No.: 707,499

[22] Filed: Sep. 24, 1996

Related U.S. Application Data

[63] Continuation of Ser. No. 241,582, May 12, 1994, abandoned.

[30] Foreign Application Priority Data

| May 12, 1993 | [JP] | Japan | 5-109697 |
| Dec. 22, 1993 | [JP] | Japan | 5-323004 |
| Apr. 1, 1994 | [JP] | Japan | 6-064274 |

[51] Int. Cl.[6] ............................................. F16C 17/02
[52] U.S. Cl. ...................................................... 384/115
[58] Field of Search ...................... 384/115, 123, 384/908, 913, 907.1, 292

[56] References Cited

U.S. PATENT DOCUMENTS

| 4,797,009 | 1/1989 | Yamazaki | 384/115 |
| 5,046,863 | 9/1991 | Sakatani et al. | 384/115 |
| 5,271,677 | 12/1993 | Sherman et al. | 384/115 |

FOREIGN PATENT DOCUMENTS 63-235719  9/1988  Japan.

*Primary Examiner*—Lenard A. Footland
*Attorney, Agent, or Firm*—Oblon, Spivak, McClelland, Maier & Neustadt, P.C.

[57] ABSTRACT

A dynamic pressure pneumatic bearing device has a groove for generating a dynamic pressure and formed on an inner circumferential face of a rotating shaft or an outer circumferential face of a fixed shaft; each of these shafts being formed by an aluminum alloy; and a wear resisting film formed on each of the inner circumferential face and the outer circumferential face. Another dynamic pressure pneumatic bearing device is constructed by a rotating shaft having a cylindrical hollow and a fixed shaft inserted into this hollow. The fixed shaft has a bearing face opposed to an inner circumferential face of the rotating shaft and separated from this inner circumferential face with a predetermined clearance. Herringbone grooves for generating a dynamic pressure and recessed portions having the same depth as the herringbone grooves are formed on the bearing face.

8 Claims, 9 Drawing Sheets

DYNAMIC PRESSURE PNEUMATIC BEARING DEVICE AND MANUFACTURING METHOD THEREOF

This application is a continuation of application Ser. No. 08/241,582, filed on May 12, 1994, now abandoned.

BACKGROUND OF THE INVENTION

1. Field of the Invention

The present invention relates to a dynamic pressure pneumatic bearing device used in a high speed rotating apparatus and suitable for a polygon scanner used in an image forming apparatus, etc. The present invention also relates to a method for manufacturing the dynamic pressure pneumatic bearing device. The present invention further relates to a method for manufacturing a groove for generating a dynamic pressure in the dynamic pressure pneumatic bearing device. For example, the dynamic pressure pneumatic bearing device and the manufacturing method of the groove for generating a dynamic pressure are applied to a polygon scanner mounted to a copying machine and rotated at a high speed.

2. Description of the Related Art

In an image forming apparatus such as a high speed digital copying machine, a laser printer, etc., a polygon scanner is used in view of a scanning speed of an image, high accuracy, etc. A dynamic pressure pneumatic bearing begins to be used in many cases as a bearing of a non-contact type to increase an operation of the polygon scanner and precisely rotate the polygon scanner at a high speed in accordance with recent requirements for a high operating speed and a high image quality.

In a general dynamic pressure pneumatic bearing device of this kind, galling and burning of the bearing device are caused by a,contact between a rotating shaft and a fixed shaft at starting and stopping times of the bearing device, or a contact between the rotating and fixed shafts caused by vibrations of the bearing device at a transporting time, etc. In this case, no rotating shaft can be rotated by these galling and burning.

For example, Japanese Patent Application Laying Open (KOKAI) No. 63-235719 shows a first method for solving this problem. In this first method, a wear resisting film is formed on a bearing face of one of the rotating and fixed shafts and a lubricating film is formed on a bearing face of the other. In a second method for forming a film on the bearing face, after a groove for generating a dynamic pressure is formed in a shaft raw material, the bearing device is processed by plating capable of controlling a film thickness with high accuracy.

However, in the above first method, the wear resisting film is formed on one bearing face and the lubricating film is formed on another bearing face by a material different from that of the wear resisting film. Therefore, it is necessary to arrange a plant for forming two kinds of films so that cost of the dynamic pressure pneumatic bearing device is greatly increased.

In the above second method, when a bearing clearance is obtained with high accuracy to obtain high bearing performance, it is necessary to carefully control a plating liquid and a plating process and a plating plant becomes very expensive. Accordingly, similar to the first method, cost of the dynamic pressure pneumatic bearing device is also increased.

Recently, a recording speed of information and an information density have been increased in a recorder such as a laser printer, a digital copying machine, a digital facsimile telegraph, etc. Such a recorder has a polygon scanner having a polygon mirror for scanning a laser beam and optically writing information. It is necessary to rotate the polygon scanner at a high speed with high accuracy in accordance with the increases in recording speed and information density. For example, the polygon scanner is rotated at a super high speed equal to or higher than 20,000 rpm. Accordingly, the polygon scanner uses a dynamic pressure pneumatic bearing device for supporting the polygon scanner in a non-contact state by generating dynamic pressure air instead of a general ball bearing.

The dynamic pressure pneumatic bearing device is generally constructed by a rotating shaft and a bearing member having a bearing face. The bearing face is opposed to a surface of the rotating shaft and is separated from this surface with a predetermined clearance. The dynamic pressure pneumatic bearing device has a groove for generating a dynamic pressure on the surface of the rotating shaft or the bearing face of the bearing member. For example, this groove is constructed by a herringbone groove. In the dynamic pressure pneumatic bearing device of this kind, the rotating shaft and the bearing member come in contact with each other at starting and stopping times of the dynamic pressure pneumatic bearing device. The rotating shaft and the bearing member come in contact with each other when an excessive shock is applied to the dynamic pressure pneumatic bearing device and the dynamic pressure pneumatic bearing device is vibrated at a transporting time. The rotating shaft is locked and burned by this contact between the rotating shaft and the bearing member so that no rotating shaft can be rotated.

For example, Japanese Patent Application Laying Open (KOKAI) No. 63-235719 proposes a dynamic pressure pneumatic bearing device for solving this problem. This dynamic pressure pneumatic bearing device is called a first general example in the following description. In the first general example, a wear resisting film mainly constructed by nickel plating is formed on a surface of a rotating shaft. A lubricating film is formed on a bearing face of a bearing member. The lubricating film is formed by impregnating an alumite film with molybdenum disulfide having a lubricating property. Thus, it is possible to prevent wearing powder from being generated by a contact between the rotating shaft and the bearing member at starting and stopping times of the dynamic pressure pneumatic bearing device. Accordingly, a stable rotating state of the dynamic pressure pneumatic bearing device is maintained for a long period.

Another dynamic pressure pneumatic bearing device is also proposed as a second general example. In this second example, an alumite film as an anodic oxide film is entirely formed on one of a surface of a rotating shaft and a bearing face of a bearing member, and a mask having the same shape as a groove for Generating a dynamic pressure is formed on the other face. Thereafter, an alumite film is formed on the other face. Thus, the groove for generating a dynamic pressure is formed so that surface hardness of each of the rotating shaft and the bearing member is improved. In this second example, the rotating shaft, the bearing member and a mirror attached to the rotating shaft are constructed by an aluminum alloy so that the rotating shaft, the bearing member and the mirror have the same coefficient of thermal expansion. Thus, it is possible to prevent an unbalanced vibration from being generated by an increase in temperature when the dynamic pressure pneumatic bearing device is rotated at a high speed.

In a method for manufacturing the groove for generating a dynamic pressure in the dynamic pressure pneumatic bearing device, the groove for generating a dynamic pressure is formed on the surface of the rotating shaft or the bearing face of the bearing member by using aluminum as a material of the rotating shaft or the bearing member in a certain case. In this case, it is necessary to improve surface hardness of aluminum since this surface hardness is low. A depth of the groove for generating a dynamic pressure has a great influence on bearing characteristics so that it is necessary to precisely form this groove. Therefore, in a certain manufacturing method, the groove for generating a dynamic pressure is manufactured by forming a plating film having predetermined thickness and hardness by using plating processing in which the thickness of the plating film can be precisely controlled. This manufacturing method is called a third general example in the following description. In this third example, a mask having the same shape as the groove for generating a dynamic pressure is first formed on the surface of the rotating shaft or the bearing face of the bearing member. Next, predetermined plating processing is performed with respect to the rotating shaft or the bearing member having the mask thereon so that a plating film having a predetermined thickness and a predetermined hardness is formed on a portion of the rotating shaft or the bearing member except for the mask. Next, this mask is removed from the rotating shaft or the bearing member and a groove for generating a dynamic pressure is formed such that this groove has a predetermined depth.

In the first general example, it is possible to prevent wearing powder from being generated at the starting and stopping times of the dynamic pressure pneumatic bearing device by the wear resisting film formed on the rotating shaft and the lubricating film formed on the bearing member. However, the wear resisting film is formed on the rotating shaft and the lubricating film is formed on the bearing member so that two processes for forming the different kinds of films are required. Therefore, the number of plants for these two processes must be increased so that cost of the dynamic pressure pneumatic bearing device is increased.

In the second general example, surface hardness can be improved by the alumite film formed on each of the rotating shaft and the bearing member. However, the alumite film is constructed by small pieces tending to easily come off. Accordingly, for example, a quality of the groove for generating a dynamic pressure is reduced until a scanner, etc. are assembled even when the groove is manufactured by this alumite film.

In the third general example, the plating film is formed outside the mask and this mask is removed so that the groove for generating a dynamic pressure and having a predetermined depth can be formed by the plating film having a predetermined thickness and a predetermined hardness. However, since the groove for generating a dynamic pressure is formed by removing the mask, portions formed and unformed as the plating film are clearly separated from each other so that these portions form a fault. Accordingly, the plating film is easily separated from the rotating shaft or the bearing member. Further, aluminum is exposed in a portion from which the mask is removed. Therefore, this portion is oxidized so that no depth of the groove can be constantly maintained.

SUMMARY OF THE INVENTION

It is therefore a first object of the present invention to provide a dynamic pressure pneumatic bearing device with high accuracy and reduced cost in which galling and burning are not easily caused, and provide a manufacturing method of the dynamic pressure pneumatic bearing device in which it is not necessary to control the thickness of a plating film with high accuracy so that the dynamic pressure pneumatic bearing device can be cheaply manufactured.

A second object of the present invention is to provide a dynamic pressure pneumatic bearing device having a precise and reliable groove for generating a dynamic pressure and manufactured with reduced cost, and provide a method for manufacturing this groove for generating a dynamic pressure.

In accordance with a first construction of the present invention, the first object can be achieved by a dynamic pressure pneumatic bearing device comprising a groove for generating a dynamic pressure and formed on an inner circumferential face of a rotating shaft or an outer circumferential face of a fixed shaft; each of the rotating and fixed shafts being formed by an aluminum alloy; and a wear resisting film formed on each of the inner circumferential face of the rotating shaft and the outer circumferential face of the fixed shaft.

In accordance with a second construction of the present invention, the wear resisting film is formed as a nickel composite plating film in which a wear resisting material is dispersed.

In accordance with a third construction of the present invention, the wear resisting material is constructed by using a silicon carbide particle having a diameter equal to or smaller than 3 $\mu$m.

In accordance with a fourth construction of the present invention, a dispersion ratio of a silicon carbide particle within the nickel composite plating film is set to a value from 0.5 to 4 weight %.

In accordance with a fifth construction of the present invention, the first object can be also achieved by a method for manufacturing a dynamic pressure pneumatic bearing device having a groove for generating a dynamic pressure and formed on one of an inner circumferential face of a rotating shaft and an outer circumferential face of a fixed shaft; the manufacturing method comprising the steps of forming a wear resisting film on a circumferential face of a raw material of the one of the rotating and fixed shafts made of an aluminum alloy to form the groove for generating a dynamic pressure; forming the groove for generating a dynamic pressure by rolling on the circumferential face on which the wear resisting film is formed; and finishing a surface of the shaft raw material such that a projected portion is removed from the circumferential face after the rolling.

In accordance with a sixth construction of the present invention, the surface of the shaft raw material is finished such that roughness of this finished surface is equal to or smaller than 0.5 $\mu$mRz.

In each of the first and second constructions of the present invention, each of the rotating and fixed shafts is formed by an aluminum alloy. Further, a wear resisting film is formed on both the inner circumferential face of the rotating shaft and the outer circumferential face of the fixed shaft. Accordingly, the dynamic pressure pneumatic bearing device can be made compact and light in weight. Further, burning and galling are not easily caused even when the dynamic pressure pneumatic bearing device is rotated at a super high speed.

In the third construction of the present invention, a silicon carbide particle having a diameter equal to or smaller than 3 $\mu$m is used as the wear resisting material. Accordingly, each of the inner circumferential face of the rotating shaft and the outer circumferential face of the fixed shaft can be formed as a smooth face having a reduced roughness.

In the fourth construction of the present invention, a dispersion ratio of the silicon carbide particle within the nickel composite plating film having the dispersed wear resisting material is set to a value from 0.5 to 4 weight %. Accordingly, brittleness of the nickel composite plating film can be restrained and set to a low value while wear resistance of the nickel composite plating film is held.

In the fifth construction of the present invention, a groove for generating a dynamic pressure is formed by rolling after a wear resisting film is formed on a circumferential face of a shaft raw material. Thereafter, this circumferential face is finished. Accordingly, it is not necessary to strictly control a thickness of the wear resisting film.

In the sixth construction of the present invention, roughness of the above finished surface of the shaft raw material is set to a value equal to or smaller than 0.5 $\mu$mRz. Accordingly, a bearing clearance can be held with high accuracy in a unit or order of $\mu$m.

In accordance with a seventh construction of the present invention, the above second object can be achieved by a dynamic pressure pneumatic bearing device comprising a rotating shaft; a bearing member having a bearing face opposed to a surface of the rotating shaft and separated from this surface with a predetermined clearance; a groove for generating a dynamic pressure on the surface of the rotating shaft or the bearing face of the bearing member; and a lubricating film formed on at least both contact face portions on which the surface of the rotating shaft and the bearing face of the bearing member can come in contact with each other.

In accordance with an eighth construction of the present invention, the lubricating film is constructed by any one of Teflon, molybdenum disulfide and boron nitride.

In accordance with a ninth construction of the present invention, a plating film having a lubricating property is formed on one of the surface of the rotating shaft and the bearing face of the bearing member on which the groove for generating a dynamic pressure is formed, and an anodic oxide film having a lubricating property is formed on the other of the surface of the rotating shaft and the bearing face of the bearing member.

In accordance with a tenth construction of the present invention, the lubricating property is provided by any one of Teflon, molybdenum disulfide and boron nitride.

In accordance with an eleventh construction of the present invention, the above second object can be also achieved by a dynamic pressure pneumatic bearing device comprising a rotating shaft; a bearing member having a bearing face opposed to a surface of the rotating shaft and separated from this surface with a predetermined clearance; a groove for generating a dynamic pressure on the surface of the rotating shaft or the bearing face of the bearing member; and a plating film formed by dispersing a wear resisting material on at least both contact face portions on which the surface of the rotating shaft and the bearing face of the bearing member can come in contact with each other.

In accordance with a twelfth construction of the present invention, the wear resisting material is constructed by any one of silicon carbide and diamond.

In accordance with a thirteenth construction of the present invention, the above second object can be also achieved by a dynamic pressure pneumatic bearing device comprising a rotating shaft; a bearing member having a bearing face opposed to a surface of the rotating shaft and separated from this surface with a predetermined clearance; and a groove for generating a dynamic pressure on the surface of the rotating shaft or the bearing face of the bearing member; the dynamic pressure pneumatic bearing device being constructed such that one of the rotating shaft and the bearing member is formed in a columnar shape having a predetermined diameter; a cylindrical hollow having a predetermined diameter is formed in the other of the rotating shaft and the bearing member to receive the one of the rotating shaft and the bearing member; at least the rotating shaft is constructed by aluminum or an aluminum alloy; and the surface of the rotating shaft opposed to the bearing face of the bearing member is constructed by stainless steel.

In accordance with a fourteenth construction of the present invention, the above second object can be also achieved by a dynamic pressure pneumatic bearing device comprising a rotating shaft; a bearing member having a bearing face opposed to a surface of the rotating shaft and separated from this surface with a predetermined clearance; and a groove for generating a dynamic pressure on the surface of the rotating shaft or the bearing face of the bearing member; the dynamic pressure pneumatic bearing device being constructed such that one of the rotating shaft and the bearing member is formed in a columnar shape having a predetermined diameter; a cylindrical hollow having a predetermined diameter is formed in the other of the rotating shaft and the bearing member to receive the one of the rotating shaft and the bearing member; and a band face having a predetermined width is formed on an inserting or inserted end tip side of the surface of the rotating shaft or the bearing face of the bearing member having the groove for generating a dynamic pressure thereon such that the band face has the same diameter as a diameter of the rotating shaft or the bearing member outside the groove for generating a dynamic pressure.

In accordance with a fifteenth construction of the present invention, the above second object can be also achieved by a method for manufacturing a groove for generating a dynamic pressure in which the groove for generating a dynamic pressure is formed on a surface of a rotating shaft or a bearing face of a bearing member opposed to the surface of the rotating shaft and separated from this surface with a predetermined clearance; the manufacturing method comprising the steps of forming the groove for generating a dynamic pressure on any one of the surface of the rotating shaft and the bearing face of the bearing member; forming a plating film on the rotating shaft or the bearing member having the groove for generating a dynamic pressure by a predetermined plating processing; and finishing a surface of the plating film.

In accordance with a sixteenth construction of the present invention, the above second object can be also achieved by a method for manufacturing a groove for generating a dynamic pressure in which the groove for generating a dynamic pressure is formed on a surface of a rotating shaft or a bearing face of a bearing member opposed to the surface of the rotating shaft and separated from this surface with a predetermined clearance; the manufacturing method comprising the steps of forming a mask having the same shape as the groove for generating a dynamic pressure on any one of the surface of the rotating shaft and the bearing face of the bearing member; forming a first plating film outside the mask on the rotating shaft or the bearing member having the mask thereon by a predetermined first plating processing; removing the mask from the one of the rotating shaft and the bearing member; and forming a second plating film on the surface of the rotating shaft or the bearing face of the bearing member including a surface of the first plating film by a predetermined second plating processing.

In the seventh or eighth construction of the present invention, a lubricating film is formed on at least both contact face portions on which the surface of the rotating shaft and the bearing face of the bearing member can come in contact with each other. This lubricating film is constructed by any one of Teflon, molybdenum disulfide and boron nitride having a lubricating property. Accordingly, lubrication between the surface of the rotating shaft and the bearing face of the. bearing member is improved. Therefore, generation of wearing powder is prevented even when the rotating shaft and the bearing member come in contact with each other at starting and stopping times of the dynamic pressure pneumatic bearing device, etc. Further, the lubricating film of the same kind is formed so that a plant for forming the lubricating film is commonly used.

In the ninth or tenth construction of the present invention, a plating film is formed on one of the rotating shaft and the bearing member having the groove for generating a dynamic pressure. An anodic oxide film is formed on the other of the rotating shaft and the bearing member. A lubricating property of each of the plating film and the anodic oxide film is provided by any one of Teflon, molybdenum disulfide and boron nitride having a lubricating property. Accordingly, the groove for generating a dynamic pressure is formed on a side of the rotating shaft or the bearing member having the plating film so that no quality of the groove for generating a dynamic pressure is reduced.

In the eleventh or twelfth construction of the present invention, a plating film having a dispersed wear resisting material is formed on at least both contact face portions on which the surface of the rotating shaft and the bearing face of the bearing member can come in contact with each other. This wear resisting material is constructed by any one of silicon carbide and diamond having a wear resisting property. Accordingly, wear resistance between the surface of the rotating shaft and the bearing face of the bearing member is improved. Therefore, generation of wearing powder is prevented even when the rotating shaft and the bearing member come in contact with each other at starting and stopping times of the dynamic pressure pneumatic bearing device, etc. Further, no quality of the groove for generating a dynamic pressure is reduced. Furthermore, the plating film of the same kind is formed so that a plant for forming the plating film is commonly used.

In the thirteenth construction of the present invention, at least the rotating shaft is constructed by aluminum or an aluminum alloy. The surface of the rotating shaft opposed to the bearing face of the bearing member is constructed by stainless steel. Accordingly, the rotating shaft can be made light in weight and no galling is easily caused by metallic characteristics of this stainless steel. Further, when the bearing face of the bearing member is similarly constructed by stainless steel, it is possible to prevent a change in clearance between the rotating shaft and the bearing member caused by an increase in temperature.

In the fourteenth construction of the present invention, a band face is formed on an inserting or inserted end tip side of the surface of the rotating shaft or the bearing face of the bearing member having the groove for generating a dynamic pressure thereon such that the band face has the same diameter as a diameter of the rotating shaft or the bearing member outside the groove for generating a dynamic pressure. Accordingly, when one of the rotating shaft or the bearing member formed in a columnar shape is inserted into a cylindrical hollow of the other, no edge of the rotating shaft or the bearing member having no groove for generating a dynamic pressure comes into collision with the groove for generating a dynamic pressure.

In the fifteenth construction of the present invention, the groove for generating a dynamic pressure is first formed on any one of the surface of the rotating shaft and the bearing face of the bearing member. A plating film is then formed on the rotating shaft or the bearing member by a predetermined plating processing. Next, a surface of this plating film is finished. Accordingly, no fault is caused between portions formed and unformed by the plating film and no base material is exposed. Further, a surface of the rotating shaft or the bearing member outside the groove for generating a dynamic pressure is finished so that a depth of the groove can be set with high accuracy and edges of this groove can be simultaneously processed.

In the sixteenth construction of the present invention, a mask having the same shape as the groove for generating a dynamic pressure is first formed on any one of the surface of the rotating shaft and the bearing face of the bearing member. A first plating film is next formed outside the mask on the rotating shaft or the bearing member by a predetermined first plating processing. After the mask is removed from the one of the rotating shaft and the bearing member, a second plating film is formed on the surface of the rotating shaft or the bearing face of the bearing member including a surface of the first plating film by a predetermined second plating processing. Accordingly, no fault is caused between portions formed and unformed by the plating film and no base material is exposed. Further, a depth of the groove for generating a dynamic pressure can be set with higher accuracy. Furthermore, plants for manufacturing the groove for generating a dynamic pressure and performing the plating processings can be commonly used.

Further objects and advantages of the present invention will be apparent from the following description of the preferred embodiments of the present invention as illustrated in the accompanying drawings.

BRIEF DESCRIPTION OF THE DRAWINGS

FIG. 1b is a plan view showing a fixed shaft arranged in the dynamic pressure pneumatic bearing device shown in FIG. 1a;

FIG. 9b is a plan view showing a bearing member arranged in the dynamic pressure pneumatic bearing device shown in FIG. 9a;

FIG. 10b is a plan view showing a bearing member arranged in the dynamic pressure pneumatic bearing device shown in FIG. 10a.

DESCRIPTION OF THE PREFERRED EMBODIMENTS

The preferred embodiments of a dynamic pressure pneumatic bearing device and a manufacturing method thereof in the present invention will next be described in detail with reference to the accompanying drawings.

Figure 1A:
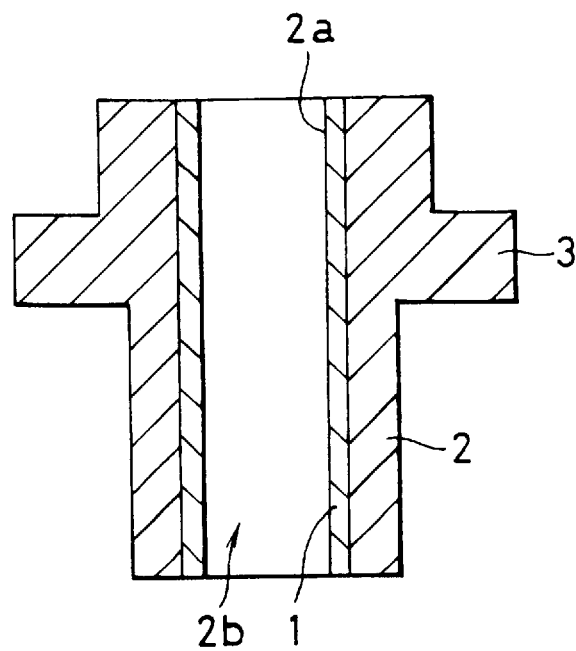
FIG. 1a is a cross-sectional view showing a rotating shaft arranged in a dynamic pressure pneumatic bearing device having each of first and second constructions in accordance with one embodiment of the present invention.
Figure 1B:
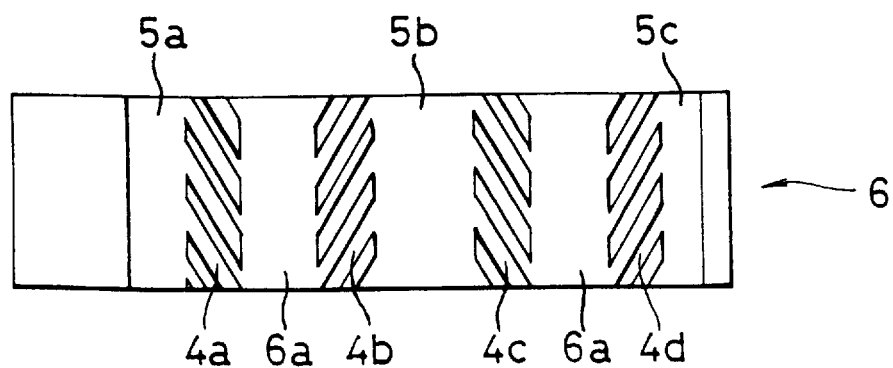
Figure 2A:
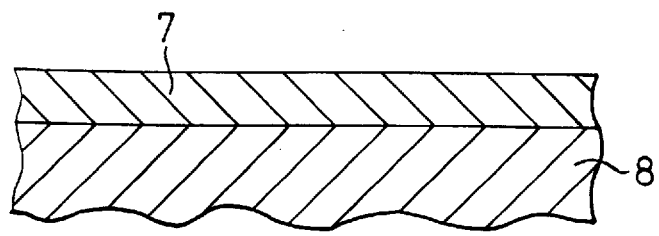
FIGS. 2a to 2c are views for explaining manufacturing processes in a manufacturing method of a dynamic pressure pneumatic bearing device relative to a fifth construction in accordance with another embodiment of the present invention.
Figure 2B:
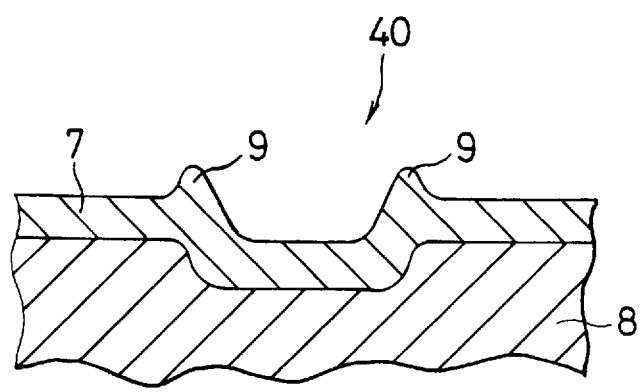
Figure 2C:
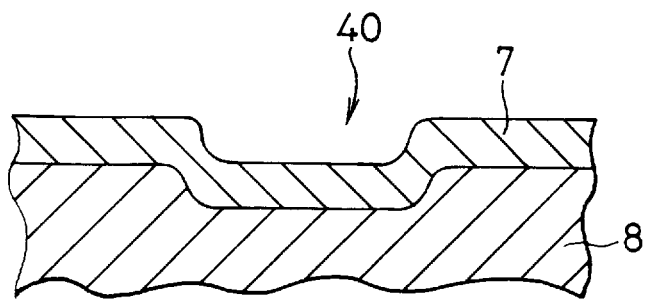

FIGS. 1a and 1b show a dynamic pressure pneumatic bearing device in accordance with one embodiment of the present invention. FIGS. 1a and 1b show a case in which a groove for generating a dynamic pressure is formed on the side of a fixed shaft. FIGS. 2 and 3 are views for explaining a manufacturing method of the dynamic pressure pneumatic bearing device in accordance with another embodiment of the present invention.

The dynamic pressure pneumatic bearing device is constructed as follows.

In FIG. 1a, a wear resisting film 1 is formed on an inner circumferential face 2a of a rotating shaft 2 approximately having a cylindrical shape. For example, this wear resisting film 1 is formed by a nickel (Ni) composite plating film having a dispersed wear resisting material. The wear resisting material preferably uses silicon carbide (SiC) having a particle diameter equal to or smaller than 3 $\mu$m. In this case, a dispersion ratio of the silicon carbide particle is set to 0.5 to 4 weight (wt) %. A columnar fixed shaft 6 shown in FIG. 1b is fitted into a hollow portion 2b of the rotating shaft 2 such that a predetermined small clearance is formed between the fixed shaft 6 and the hollow portion 2b. A polygon mirror attaching portion 3 having a flange shape is formed in an outer circumferential portion of the rotating shaft 2 such that an unillustrated polygon mirror can be attached to this polygon mirror attaching portion 3. A raw material of this rotating shaft 2 is constructed by using an aluminum alloy in view of light weight, easiness in processing, prevention of attachment of magnetic powder, etc.

In FIG. 1b, a wear resisting film is formed on an outer circumferential face 6a as a bearing face of the fixed shaft 6 by a manufacturing method described later. For example, this wear resisting film is also formed by a nickel (Ni) composite plating film having a dispersed wear resisting material. This wear resisting material preferably uses silicon carbide having a particle diameter equal to or smaller than 3 $\mu$m. In this case, a dispersion ratio of the silicon carbide particle is set to 0.5 to 4 weight (wt) %. Grooves 4a, 4b, 4c and 4d for generating a dynamic pressure are formed on the outer circumferential face 6a of the rotating shaft 6 such that each of these grooves approximately has several $\mu$m in depth. Further, recessed portions 5a, 5b and 5c are also formed on the outer circumferential face 6a such that each of these recessed portions approximately has the same depth as each of the grooves 4a to 4d. An aluminum alloy is also used in a raw material of this fixed shaft 6 for reasons similar to those in the case of the rotating shaft 2.

A method for manufacturing this dynamic pressure pneumatic bearing device will next be described with reference to FIGS. 2 and 3.

Figure 3A:
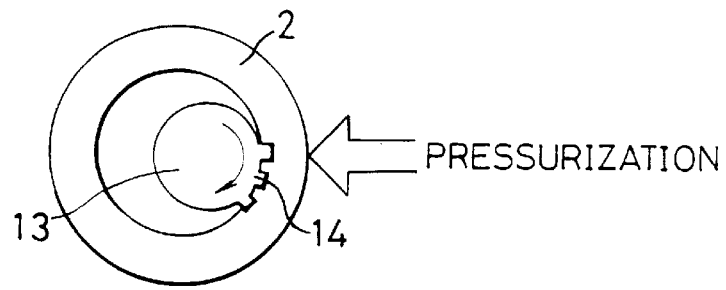
FIG. 3a is a view showing an example of a method for forming a groove for generating a dynamic pressure in the manufacturing method illustrated in FIGS. 2a to 2c and shows a case in which the groove is formed in a rotating shaft.
Figure 3B:
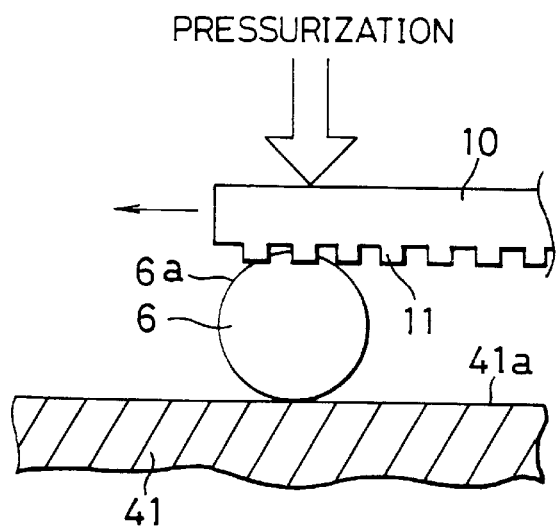
FIG. 3b is a view showing this example and shows a case in which the groove is formed in a fixed shaft.

A shaft raw material 8 processed in a predetermined shape is first masked in a state in which a required portion is unmasked in the shaft raw material 8. Thereafter, as shown in FIG. 2a, nickel composite plating processing is performed by dispersing a wear resisting material onto this shaft raw material 8. Thus, a nickel composite plating film 7 as a wear resisting film is formed on the inner circumferential face 2a in the case of the rotating shaft 2 and is formed on the outer circumferential face 6a in the case of the fixed shaft 6. The nickel composite plating film 7 is formed on a surface of the shaft raw material 8. If this shaft raw material 8 is the rotating shaft 2, a die 13 for rolling is pressed and pressurized against the inner circumferential face 2a of the rotating shaft 2 as shown in FIG. 3a. The rolling die 13 has a groove pattern 14 for generating a dynamic pressure and formed by projected portions as shown in FIG. 3a. The rolling die 13 is rotated while this pressurizing state is maintained. Thus, a groove 40 for generating a dynamic pressure as shown in FIG. 2b is formed on the inner circumferential face 2a of the rotating shaft 2. If a groove is formed in the fixed shaft 6, a die 10 for rolling is pressed and pressurized against the outer circumferential face 6a of the fixed shaft 6 as shown in FIG. 3b. The rolling die 10 has a groove pattern 11 for generating a dynamic pressure and formed by projected portions as shown in FIG. 3b. While this pressurizing state is maintained, the rolling die 10 is moved in parallel with a surface 41a of a supporting base 41. Thus, a groove 40 for generating a dynamic pressure is formed on the outer circumferential face 6a of the fixed shaft 6.

When the groove 40 for generating a dynamic pressure is formed and the shaft raw material 8 is the rotating shaft 2, the inner circumferential face 2a is finished by honing or cutting processing using a diamond bit. In a rolling process, a burr 9 caused at an edge of the groove 40 for generating a dynamic pressure is removed therefrom and a projected portion is removed from a surface of the nickel composite plating film 7. Further, an inside diameter and a surface roughness of the rotating shaft 2 are adjusted within predetermined values in the rolling process. When the shaft raw material 8 is the fixed shaft 6, the outer circumferential face 6a is similarly finished by cylindrical grinding or centerless processing so that an outside diameter and a surface roughness of the fixed shaft 6 are adjusted within predetermined values.

When the rotating shaft 2 and the fixed shaft 6 are thus manufactured, the fixed shaft 6 is fitted onto the inner circumferential face 2a of the rotating shaft 2 so that a dynamic pressure pneumatic bearing device is constructed.

An operation of the dynamic pressure pneumatic bearing device will next be explained.

When the fixed shaft 6 is fitted onto the inner circumferential face 2a of the rotating shaft 2, a wear resisting film is formed on each of the outer circumferential face 6a of the fixed shaft 6 and the inner circumferential face 2a of the rotating shaft 2 by the above manufacturing method. Further, the outer circumferential face 6a and the inner circumferential face 2a are finished such that the surface roughness of each of these faces is equal to or smaller than a predetermined value. Accordingly, wearing powder and galling are not caused even when the outer circumferential face 6a of the fixed shaft 6 and the inner circumferential face 2a of the rotating shaft 2 come in contact with each other by shocks at assembling and transporting times of the dynamic pressure pneumatic bearing device, etc. Accordingly, no performance of the dynamic pressure pneumatic bearing device is reduced.

When the dynamic pressure pneumatic bearing device is used, the number of rotations of the dynamic pressure pneumatic bearing device is small at starting and stopping times of the dynamic pressure pneumatic bearing device, etc. Accordingly, no sufficient dynamic pressure is generated so that the inner circumferential face 2a of the rotating shaft 2 and the outer circumferential face 6a of the fixed shaft 6 come in contact with each other in a certain case. However, the wear resisting film is formed on both the inner circumferential face 2a and the outer circumferential face 6a. Accordingly, burning and galling are not caused so that stable performance of the dynamic pressure pneumatic bearing device can be obtained at any time and life of the dynamic pressure pneumatic bearing device is lengthened.

In this embodiment, wear resisting films 1 and 7 are formed on both the inner circumferential face 2a of the rotating shaft 2 and the outer circumferential face 6a of the fixed shaft 6 as bearing faces. Thereafter, grooves 4a to 4d and 40 for generating a dynamic pressure are formed on one of these two bearing faces by rolling. Further, after this rolling, this bearing face is finished to remove projected portions therefrom. Accordingly, it is not necessary to strictly control thicknesses of the wear resisting films 1 and 7 so that mass production efficiency is greatly improved. As a result, the dynamic pressure pneumatic bearing device can be manufactured with reduced cost.

Figure 4:
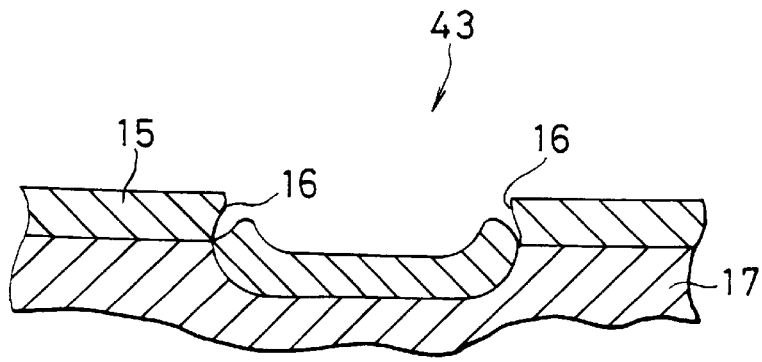
FIG. 4 is a view for explaining a comparison example corresponding to one embodiment of the present invention relative to a fourth construction of the dynamic pressure pneumatic bearing device.

FIG. 4 is a main cross-sectional view showing a comparison example for explaining a dynamic pressure pneumatic bearing device having a fourth construction in accordance with another embodiment of the present invention. In FIG. 4, constructional portions similar to those in the above-mentioned embodiment are designated by the same reference numerals and an explanation of these constructional portions is omitted in the following description.

In FIG. 4, a shaft raw material 17 of a rotating shaft or a fixed shaft is formed by an aluminum alloy. A nickel composite plating film 15 having a wear resisting property is formed on the shaft raw material 17 by the above-mentioned manufacturing method. A crack 16 is generated in the nickel composite plate film 15. A groove 43 for generating a dynamic pressure is formed by rolling.

This generation of the crack 16 relates to the dispersion ratio of a silicon carbide particle within the nickel composite plating film 15 when the groove 43 for generating a dynamic pressure is formed by rolling. When the dispersion ratio of the silicon carbide particle within the nickel composite plating film 15 is greater than 4 weight %, brittleness of the nickel composite plating film 15 is increased so that the crack 16 is generated. In contrast to this, when the dispersion ratio of the silicon carbide particle is smaller than 0.5 weight %, the wear resistance property is greatly reduced. Therefore, for example, there is a possibility of burning and galling of the dynamic pressure pneumatic bearing device when the dynamic pressure pneumatic bearing device is applied to a high speed rotating apparatus such as a polygon scanner. Accordingly, the dispersion ratio of the silicon carbide particle within the nickel composite plating film 15 is preferably set to a value from 0.5 to 4 weight %.

In this embodiment, the dispersion ratio of the silicon carbide particle within the nickel composite plating film 15 is set to a value from 0.5 to 4 weight %. Accordingly, no crack 16 is caused in the nickel composite plating film 15 and burning and galling of the dynamic pressure pneumatic bearing device are not caused so that the dynamic pressure pneumatic bearing device has a high quality.

Figure 5A:
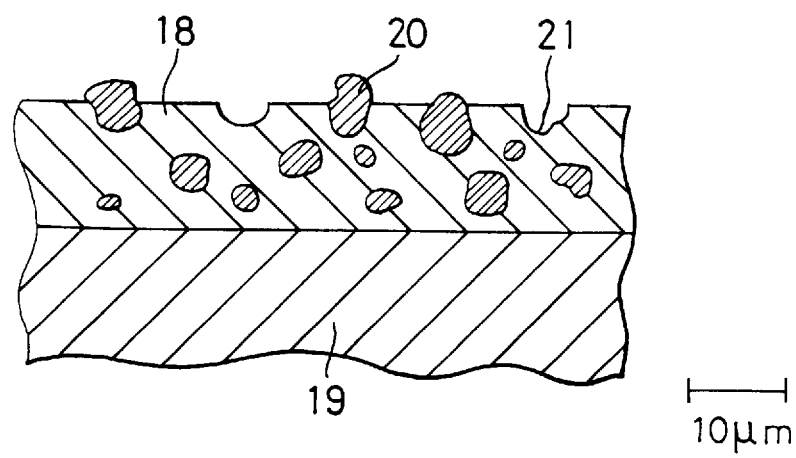
FIG. 5a is a view for explaining a comparison example corresponding to one embodiment of the present invention relative to a third construction of the dynamic pressure pneumatic bearing device or a sixth construction of the manufacturing method.
Figure 5B:
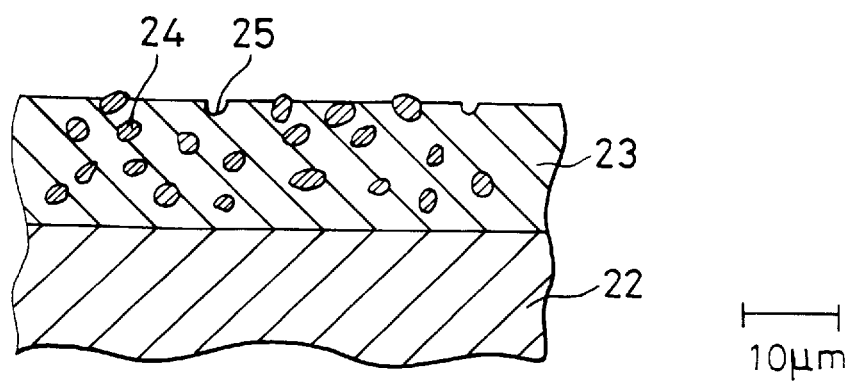
FIG. 5b is a view for explaining this embodiment of the present invention relative to the third construction of the dynamic pressure pneumatic bearing device or the sixth construction of the manufacturing method.

FIG. 5a is a cross-sectional view for mainly explaining a comparison example corresponding to one embodiment of the present invention relative to a third construction of the dynamic pressure pneumatic bearing device or a sixth construction of the manufacturing method. FIG. 5b is a cross-sectional view for mainly explaining this embodiment of the present invention relative to the third construction of the dynamic pressure pneumatic bearing device or the sixth construction of the manufacturing method.

In FIGS. 5a and 5b, each of reference numerals 19 and 22 designates a shaft raw material of a rotating shaft or a fixed shaft. This shaft raw material is formed by an aluminum alloy. Each of reference numerals 18 and 23 designates a main component of a nickel composite plating film. Silicon carbide particles 20 and 24 are respectively dispersed into the nickel composite plating films 18 and 23. Recessed portions 21 and 25 are formed after the silicon carbide particles come out and are respectively removed from surfaces of the nickel composite plating films 18 and 23.

As mentioned above, each of dispersions in thicknesses of films on both bearing faces of the rotating and fixed shafts is preferably restrained and set to a value equal to or smaller than 0.5 $\mu$m so as to achieve a bearing clearance with high accuracy, especially, a bearing clearance equal to or smaller than a length in a unit or order of $\mu$m. As shown in FIG. 5a, when a diameter of the silicon carbide particle dispersed into the nickel composite plating film 18 is greater than 3 $\mu$m, a large silicon carbide particle 20 is projected onto a finished surface of the nickel composite plating film 18. Otherwise, a large recessed portion 21 is formed after this large silicon carbide particle 20 comes out and is removed from the finished surface of the nickel composite plating film 18. Therefore, no dispersion in film thickness can be restrained and set to a value equal to or smaller than a predetermined value. However, as shown in FIG. 5b, if the silicon carbide particle 24 having a diameter within 3 $\mu$m is used, a large projected portion and a recessed portion 25 are not formed even after a bearing surface has been finished. Therefore, for example, roughness of the bearing surface can be easily restrained to a required value such as 0.5 μmRz (or a value equal to or smaller than 0.5 S in Rmax display). Accordingly, a bearing clearance having a great influence on performance of the dynamic pressure pneumatic bearing can be held in a unit or order of μm.

In this embodiment, the silicon carbide particle 24 having a diameter equal to or smaller than 3 μm is dispersed into the nickel composite plating film 23. Simultaneously, the bearing surface is finished such that this bearing surface has a roughness equal to or smaller than 0.5 μmRz. Accordingly, an excellent wearing resistance property can be obtained and the bearing clearance can be held in a unit or order of μm so that the dynamic pressure pneumatic bearing device has high performance.

As mentioned above, in accordance with a first construction of the present invention, each of rotating and fixed shafts constituting a dynamic pressure pneumatic bearing is formed by an aluminum alloy. Further, a wear resisting film is formed on both bearing faces. Accordingly, both the rotating and fixed shafts can be made compact and light in weight. Further, it is possible to provide a dynamic pressure pneumatic bearing device having high performance in which burning and galling are not caused even when the dynamic pressure pneumatic bearing device is rotated at a super high speed.

In accordance with a second construction of the present invention, a nickel composite plating film having a dispersed wear resisting material is formed on both the bearing faces. Accordingly, it is possible to provide a dynamic pressure pneumatic bearing device having high performance in which burning and galling are not caused.

In accordance with a third construction of the present invention, a silicon carbide particle having a diameter equal to or smaller than 3 μm is used as the wear resisting material. Accordingly, a bearing clearance can be held with high accuracy in a unit or order of μm. Therefore, it is possible to provide a dynamic pressure pneumatic bearing device having high performance and excellent durability.

In accordance with a fourth construction of the present invention, a dispersion ratio of the silicon carbide particle within the nickel composite plating film is set to a value from 0.5 to 4 weight %. Accordingly, wear resistance of the nickel composite plating film can be held and brittleness of this film can be restrained and set to a low value. Therefore, it is possible to prevent a crack from being caused in the nickel composite plating film.

In accordance with a fifth construction of the present invention, a groove for generating a dynamic pressure is formed by rolling after a wear resisting film is formed on a circumferential face of a shaft raw material. Thereafter, this circumferential face is finished. Accordingly, it is not necessary to strictly control a thickness of the wear resisting film and mass production efficiency is greatly improved. Therefore, it is possible to manufacture a dynamic pressure pneumatic bearing device having high performance with reduced cost.

In accordance with a sixth construction of the present invention, roughness of the above finished bearing surface is set to a value equal to or smaller than 0.5 μmRz. Accordingly, a bearing clearance having a great influence on performance of the pneumatic bearing can be held with high accuracy in a unit or order of μm.

Figure 6:
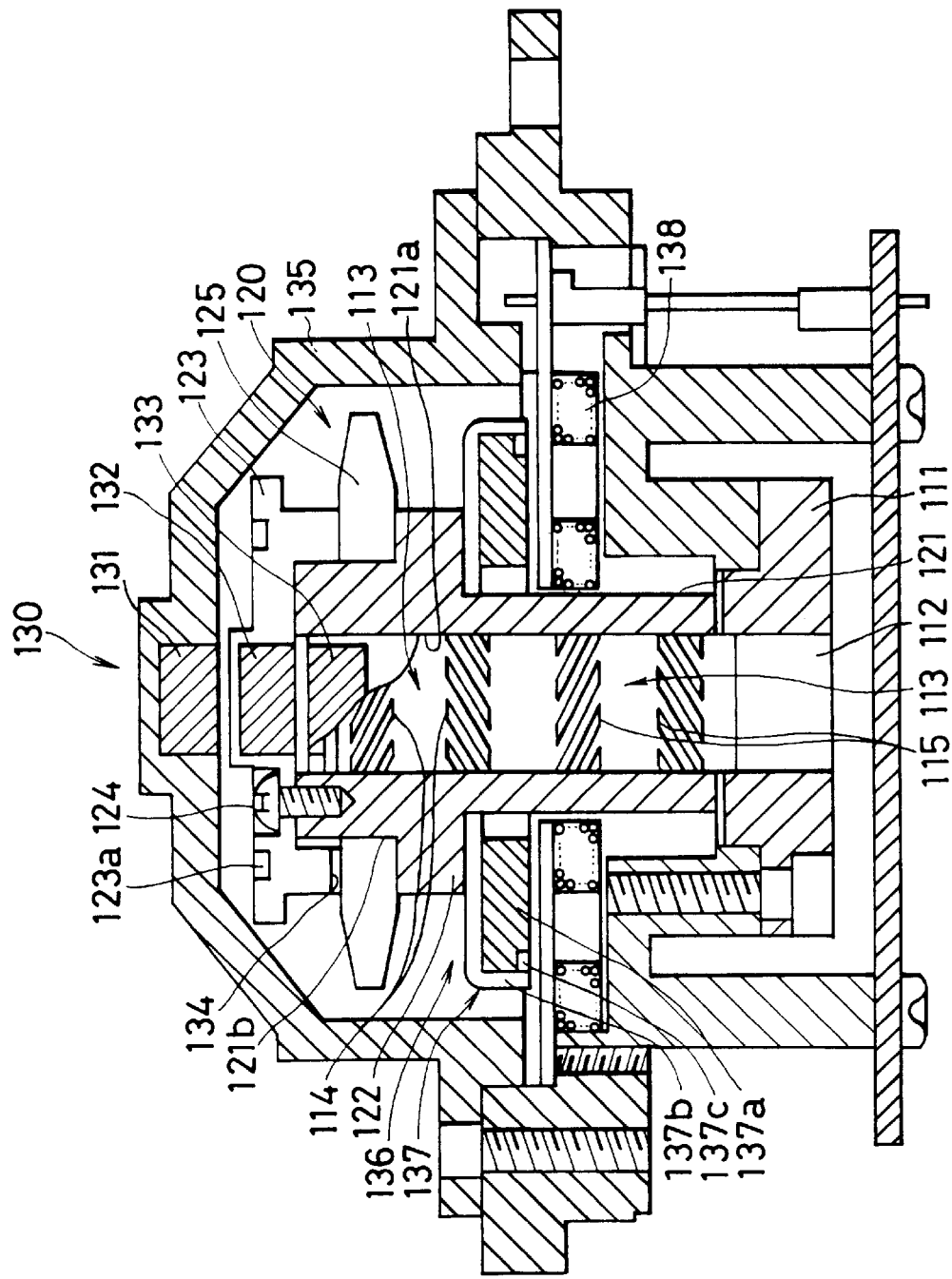
FIG. 6 is a cross-sectional view showing the entire construction of a polygon scanner using a dynamic pressure pneumatic bearing device in accordance with another embodiment of the present invention.
Figure 7A:
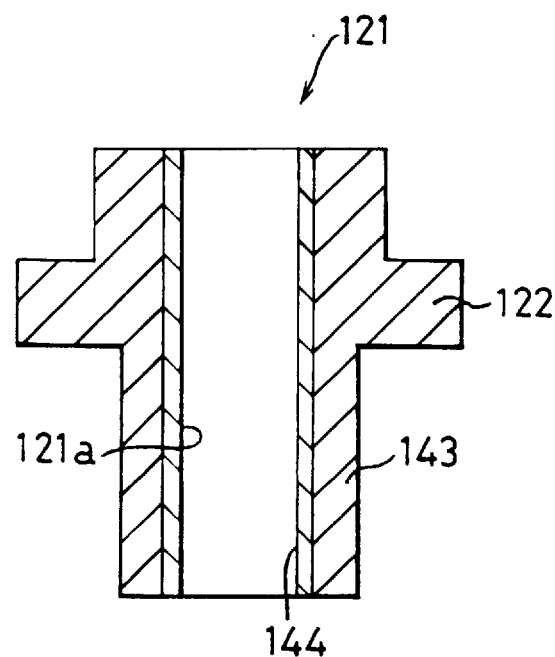
FIG. 7a is a cross-sectional view showing a rotating shaft arranged in the dynamic pressure pneumatic bearing device shown in FIG. 6.
Figure 7B:
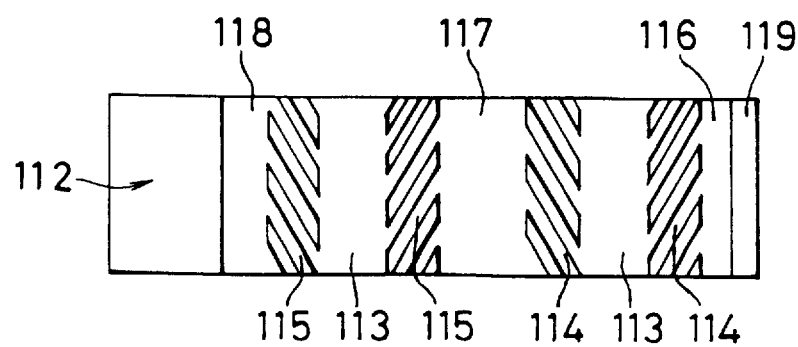
FIG. 7b is a plan view showing a bearing member arranged in the dynamic pressure pneumatic bearing device shown in FIG. 6.

FIG. 6 is a cross-sectional view showing the entire construction of a polygon scanner using a dynamic pressure pneumatic bearing device in accordance with another embodiment of the present invention. FIGS. 7a and 7b are views showing the dynamic pressure pneumatic bearing device shown in FIG. 6. The embodiment shown in FIGS. 6 and 7 corresponds to any one of seventh, eighth, fourteenth and fifteenth constructions of the present invention.

In FIGS. 6 and 7, a fixed shaft 112 as a bearing member is vertically fitted and fixed to a central portion of a housing 111. For example, the fixed shaft 112 is fixed by shrinkage fitting to this central portion of the housing 111. A radial bearing face 113 is formed in an outer circumferential portion of this fixed shaft 112. Each of pairs of herringbone grooves 114 and 115 as grooves for generating a dynamic pressure is formed on the radial bearing face 113 at an equal interval in a circumferential direction such that each of the herringbone grooves has several μm in depth. Recessed portions 116 to 118 are formed such that these recessed portions approximately have the same depth as the herringbone grooves 114 and 115. The bearing face 113 is opposed to an inner circumferential surface 121a of a rotating shaft 121 having a cylindrical hollow. The bearing face 113 of the fixed shaft 112 is spaced from the inner circumferential surface 121a of the rotating shaft 121 with a predetermined bearing clearance so that the rotating shaft 121 can be rotated in relation to the fixed shaft 112. Namely, the fixed shaft 112 and the rotating shaft 121 constitute the dynamic pressure pneumatic bearing device.

A mirror receiving flange 122 is formed in an upper portion of the rotating shaft 121. A polygon mirror 125 is attached to the mirror receiving flange 122 by a mirror presser 123. The polygon mirror 125 is fitted onto an upper outer circumferential face 121b of the rotating shaft 121. A bolt 124 is screwed into the upper portion of the rotating shaft 121 and presses this polygon mirror 125 against the flange 122 through the mirror presser 123. The mirror presser 123 holds a magnet 132 constituting an axial magnetic bearing 130 in a central portion of this mirror presser 123. A communication hole 134 for damping a vertical vibration is formed between the mirror presser 123 and the polygon mirror 125. The communication hole 134 provides predetermined damping characteristics to the axial magnetic bearing 130. A balance correcting groove 123a is formed on an upper face portion of the mirror presser 123 to correct an unbalance of the dynamic pressure pneumatic bearing device at a rotating time thereof.

The axial magnetic bearing 130 is constructed by three magnets 131, 132 and 133. The magnets 131 to 133 have the same pole on their opposed faces on an axis of the fixed shaft 112 so that these magnets are repulsive to each other. The magnet 131 is attached to an upper casing 135 above the magnet 132. The magnet 133 is fixed to an upper end of the fixed shaft 112. Thus, the rotating shaft 121, the mirror presser 123, the polygon mirror 125 and the magnet 132 are biased such that these members float upward from the fixed shaft 112 at any time. Thus, the rotating shaft 121 is supported in a non-contact state.

A motor 136 of a face opposing type rotates the polygon mirror 125. This motor 136 has a rotor magnet assembly 137 fixed to the rotating shaft 121, a stator coil portion 138 opposed to a lower face of the rotor magnet assembly 137, and an unillustrated Hall element. The rotor magnet assembly 137 constitutes a motor portion in which a rotor magnet 137a is integrally mounted to the rotating shaft 121 by a rotor flange 137b. The rotor flange 137b also functions as a yoke.

The motor assembly 137 constitutes a rotating body 120 by attaching this motor assembly 137, the mirror presser 123 and the polygon mirror 125 to the rotating shaft 121. A balance correcting groove 137c is formed in the rotor magnet 137a to correct an unbalance of this rotor magnet. When the rotating body 120 is rotated, the balance correcting groove 137c reduces vibrations of the rotating body 120 caused by an unbalance thereof in cooperation with the balance correcting groove 123a formed in the mirror presser 123 such that an unbalancing amount of the rotating body 120 is equal to or smaller than several mg. This motor 136 rotates the rotor magnet assembly 137 by magnetizing the stator coil portion 138 in a predetermined magnetizing system. Thus, the rotating shaft 121 and the polygon mirror 125 in the rotating body 120 can be rotated.

When the polygon mirror 125 is rotated, air in the herringbone grooves 114, 115 and the recessed portions 116 to 118 formed on the bearing face 113 of the fixed shaft 112 flows into the above bearing clearance between the fixed shaft 112 and the rotating shaft 121 while this air is pressurized in a rotating direction of the rotating shaft 121. The herringbone grooves 114, 115 and the recessed portions 116 to 118 formed on the bearing face 113 of the fixed shaft 112 are shown by hatching portions in FIG. 7b. Thus, a dynamic pressure is generated by this air flow. When this dynamic pressure reaches a predetermined pressure, the rotating shaft 121 completely floats from the fixed shaft 112 in a radial direction of the rotating shaft 121. Accordingly, no rotating shaft 121 comes in contact with the fixed shaft 112 so that the rotating shaft 121 attains a high speed rotatable state.

As shown in FIG. 7a, a base material 143 of the rotating shaft 121 is constructed by aluminum or an aluminum alloy which is light in weight and nonmagnetic. The aluminum or the aluminum alloy is selected to improve a vibration proof property, processing and assembly of the rotating body 120 and stabilize a balance of the rotating body 120 when the rotating body 120 is rotated. A lubricating film 144 as a plating film is formed by dispersing Teflon particles (PTFE) in nickel plating on the inner circumferential face 121a of the rotating shaft 121 so as not to generate wearing powder and galling even when the inner circumferential face 121a comes in contact with the bearing face 113 of the fixed shaft 112. Thus, the inner circumferential face 121a of the rotating shaft 121 comes in slide contact with the bearing face 113 of the fixed shaft 112 by the lubricating film 144.

The fixed shaft 112 is constructed by aluminum or an aluminum alloy. As shown in FIG. 7b, herringbone grooves 114, 115 and recessed portions 116 to 118 are formed on the bearing face 113. Further, a band face 119 is formed on an upper end side of the bearing face 113 above the recessed portion 116 and has a predetermined width equal to a diameter of the bearing face 113. The rotating shaft 121 can be smoothly fitted and inserted into a hollow by the band face 119 of the fixed shaft 112 such that no rotating shaft 121 is damaged by a collision between an edge of the rotating shaft 121 and the herringbone grooves 114, 115, etc., and no wearing powder is generated. A lubricating film is formed on the bearing face 113 of the fixed shaft 112 although this lubricating film is not shown in FIGS. 6 and 7. A manufacturing process of this lubricating film is similar to that of the lubricating film 144 formed on the inner circumferential face 121a of the rotating shaft 121. An outside diameter of this lubricating film is set and a surface of this lubricating film is finished so that wearing powder and galling are not caused even when the inner circumferential face 121a of the rotating shaft 121 and the bearing face 113 of the fixed shaft 112 come in contact with each other.

The fixed shaft 112 is first formed in a predetermined shape by cutting or grinding processing. Thereafter, herringbone grooves 114, 115 and recessed portions 116 to 118 are formed by well-known etching, rolling, etc. Next, the fixed shaft 112 is dipped into a plating bath in which Teflon particles (PTFE) are dispersed into a well-known electroless nickel plating liquid. Thus, predetermined composite plating processing is performed with respect to the fixed shaft 112 so that the above-mentioned lubricating film having the dispersed Teflon particles (PTFE) is formed in the nickel plating. A lubricant having a lubricating property is preferably constructed by molybdenum disulfide ($MoS_2$) or boron nitride (BN) in addition to PTFE. Next, an outside diameter of the fixed shaft 112 having the above lubricating film is finally set to secure depths of the herringbone grooves 114 and 115. Thereafter, burrs of the herringbone grooves 114 and 115, etc. are removed therefrom by barrel or buffing processing. Further, edges of the herringbone grooves 114 and 115, etc. are rounded such that wearing powder and galling are not caused. The lubricating film 144 of the rotating shaft 121 is formed by a manufacturing process similar to the above manufacturing process.

In this embodiment, the lubricating films having the dispersed Teflon particles (PTFE), etc. are respectively formed on the inner circumferential face 121a of the rotating shaft 121 and the bearing face 113 of the fixed shaft 112. Accordingly, lubrication or slide between the inner circumferential face 121 and the bearing face 113 is improved. Further, it is possible to prevent wearing powder and galling from being caused even when the rotating shaft 121 and the fixed shaft 112 come in contact with each other at starting and stopping times of the rotating body 120, etc.

The band face 119 is finished and formed on an upper end side of the fixed shaft 112 such that this band face 119 has the same diameter as the bearing face 113. Accordingly, no wearing powder is generated even when the inner circumferential face 121a of the rotating shaft 121 comes in frictional contact with the bearing face 113 of the fixed shaft 112. Further, when the dynamic pressure pneumatic bearing device is assembled and the rotating shaft 121 is moved by a shock, etc., it is possible to prevent the rotating shaft 121 from being damaged by a collision between an edge of the rotating shaft 121 and the herringbone grooves 114, 115 of the fixed shaft 112, etc., and prevent wearing powder from being generated.

When the herringbone grooves 114 and 115 are plated and are then formed by rolling, a fault is caused in a plating film so that it is difficult to process the plating film. Accordingly, the plating film must be processed such that the plating film has a thickness equal to or greater than a depth of each of the herringbone grooves 114 and 115 even when the herringbone grooves are formed by etching. Therefore, cost of the dynamic pressure pneumatic bearing device is increased. However, in the present invention, after the herringbone grooves 114 and 115 are formed, the above-mentioned lubricating film is formed on the bearing face 113 including the herringbone grooves 114 and 115, etc. by electroless nickel plating for easily adjusting a film thickness. Accordingly, the lubricating film is easily formed with high accuracy. Further, no fault is caused between portions formed and unformed by the lubricating film so that separation of the lubricating film is prevented. Further, no base material 143 is exposed so that oxidation of the base material 143 is prevented. Therefore, it is possible to prevent the depth of each of the herringbone grooves 114 and 115, etc. from being changed.

Accordingly, the dynamic pressure pneumatic bearing device can be manufactured with high accuracy, high reliability and reduced cost.

Figure 8:
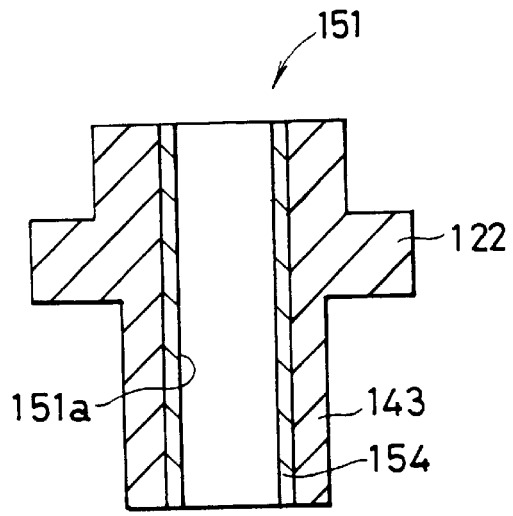
FIG. 8 is a cross-sectional view showing a main portion of a dynamic pressure pneumatic bearing device in accordance with another embodiment of the present invention.

FIG. 8 is a cross-sectional view showing a main portion of a dynamic pressure pneumatic bearing device in accordance with another embodiment of the present invention. This embodiment corresponds to any one of the seventh to tenth, fourteenth and fifteenth constructions. Constructional portions similar to those in the above-mentioned embodiment shown in FIGS. 6 and 7 are designated by the same reference numerals and an explanation thereof is omitted in the following description.

In FIG. 8, a rotating shaft 151 is formed by a base material 143 and constitutes the dynamic pressure pneumatic bearing device together with a fixed shaft 112. This dynamic pressure pneumatic bearing device is applied to a scanner explained in the above embodiment shown in FIGS. 6 and 7. A motor assembly 137, a mirror presser 123 and a polygon mirror 125 are attached to the rotating shaft 151 so that a rotating body 120 is constructed.

The fixed shaft 112 is inserted into a cylindrical hollow of the rotating shaft 151 and well-known anodic oxidation processing is performed with respect to an inner circumferential surface 151a of the rotating shaft 151 opposed to a bearing face 113. Thus, a porous alumite film as an anodic oxide film is formed on the inner circumferential face 151a. Thereafter, Teflon particles (PTFE) are included into this porous alumite film so that a lubricating film 154 is formed on the rotating shaft 151. Thus, lubrication of the rotating shaft 151 is improved so that wearing powder and galling are not caused even when the rotating shaft 151 comes in contact with the bearing face 113 of the fixed shaft 112.

In this embodiment, operations and effects similar to those in the above embodiment shown in FIGS. 6 and 7 can be obtained. Further, since the lubricating film 154 composed of an anodic oxide film is formed on the inner circumferential face 151a of the rotating shaft 151 having no irregularities, no small pieces of the alumite film come off and no herringbone grooves 114 and 115 are filled with these small pieces so that no rotating shaft 151 is locked. Further, no quality of each of the herringbone grooves 114 and 115 is reduced.

Figure 9A:
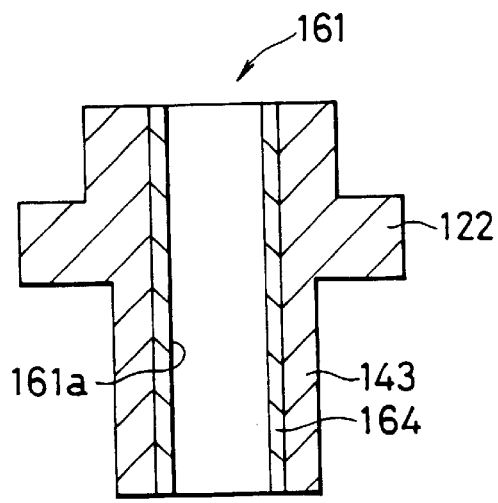
FIG. 9a is a cross-sectional view showing a rotating shaft arranged in a dynamic pressure pneumatic bearing device in accordance with another embodiment of the present invention.
Figure 9B:
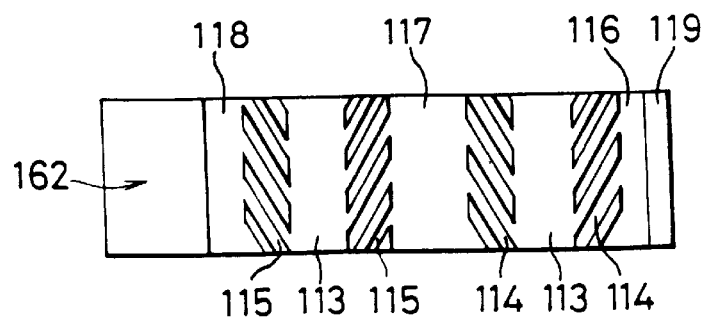

FIGS. 9a and 9b are cross-sectional views showing a main portion of a dynamic pressure pneumatic bearing device in accordance with another embodiment of the present invention. This embodiment corresponds to any one of the thirteenth to fifteenth constructions of the present invention. Constructional portions similar to those in the above-mentioned embodiment shown in FIGS. 6 and 7 are designated by the same reference numerals and an explanation thereof is omitted in the following description.

In FIGS. 9a and 9b, a rotating shaft 161 is formed by a base material 143 and a fixed shaft 162 as a bearing member is made of stainless steel. The rotating shaft 161 and the fixed shaft 162 constitute the dynamic pressure pneumatic bearing device. This dynamic pressure pneumatic bearing device is applied to a scanner explained in the above embodiment shown in FIGS. 6 and 7.

The fixed shaft 162 is vertically fitted and fixed to a central portion of a housing 111. Herringbone grooves 114, 115, recessed portions 116 to 118 and a band face 119 are formed on a bearing face 113. A magnet 133 is fixed to an upper end of the fixed shaft 162. Similar to the embodiment shown in FIGS. 6 and 7, a lubricating film is formed on the fixed shaft 162 and an outside diameter of the fixed shaft 162 is set and a surface of the lubricating film is finished. A motor assembly 137, a mirror presser 123 and a polygon mirror 125 are attached to the rotating shaft 161 so that a rotating body 120 is constructed.

The fixed shaft 162 is inserted into a cylindrical hollow of the rotating shaft 161 and a pipe 164 is fixed by shrinkage fitting, etc. onto an inner circumferential surface 161a of the rotating shaft 161 opposed to the bearing face 113. This pipe 164 is made of stainless steel having a predetermined thickness since no galling is easily caused in stainless steel. The base material 143 of the rotating shaft 161 is made of aluminum or an aluminum alloy and the inner circumferential face 161a of the rotating shaft 161 is constructed by the pipe 164 so that the rotating shaft 121 can be made light in weight and galling can be prevented.

In this embodiment, operations and effects similar to those in the above embodiment shown in FIGS. 6 and 7 can be obtained. Further, the fixed shaft 162 and the inner circumferential face 161a of the rotating shaft 161 forming a bearing clearance are constructed by the same material so that no bearing clearance is changed even when temperatures of the fixed shaft 162 and the inner circumferential face 161a are increased by a high speed rotation of the rotating shaft 161, etc. Accordingly, the rotating shaft 161 can be stably rotated in the dynamic pressure pneumatic bearing device.

Figure 10A:
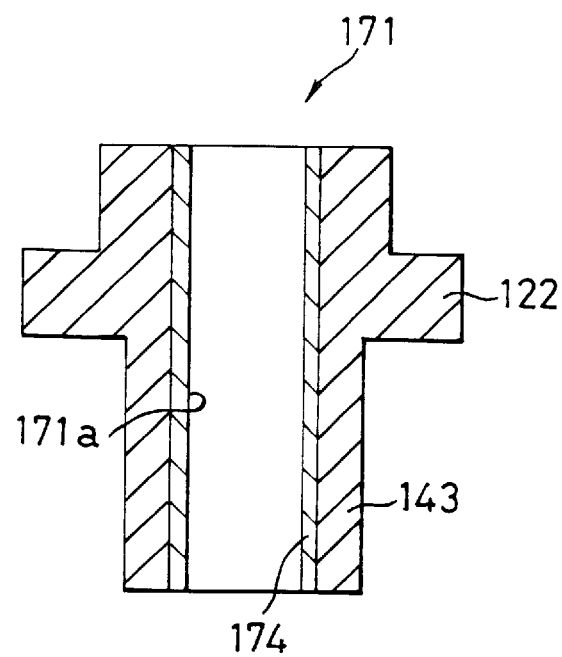
FIG. 10a is a cross-sectional view showing a rotating shaft arranged in a dynamic pressure pneumatic bearing device in accordance with another embodiment of the present invention.
Figure 10B:
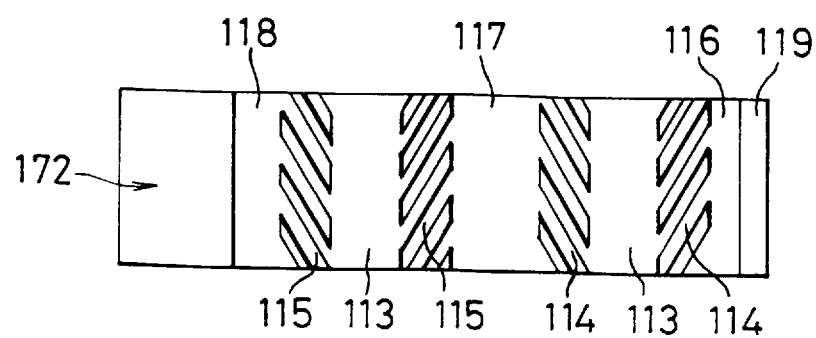
Figure 11A:
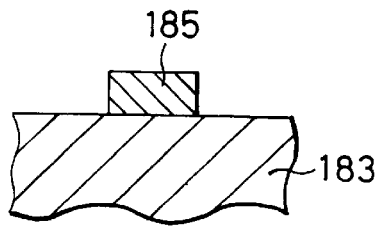
FIGS. 11a to 11d are views for explaining one example of manufacturing processes of a method for manufacturing a groove for generating a dynamic pressure in a sixteenth construction of the present invention.
Figure 11B:
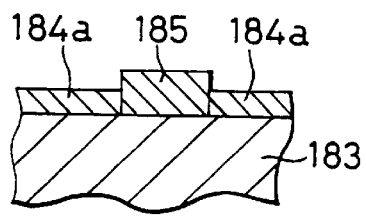
Figure 11C:
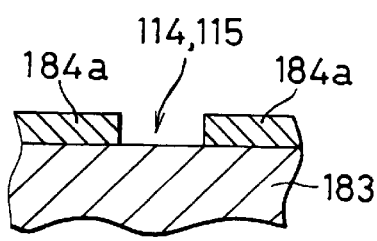
Figure 11D:
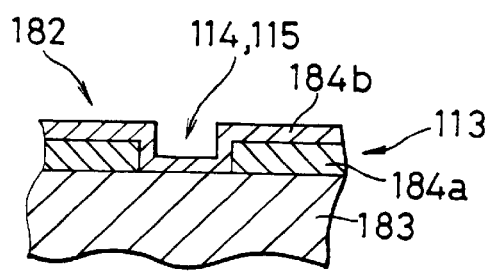

FIGS. 10a and 10b are views showing a dynamic pressure pneumatic bearing device in accordance with another embodiment of the present invention. FIG. 10a is a cross-sectional view showing a rotating shaft arranged in the dynamic pressure pneumatic bearing device. FIG. 10b is a plan view showing a bearing member arranged in the dynamic pressure pneumatic bearing device. This embodiment corresponds to any one of the seventh, eighth, eleventh, twelfth, fourteenth and fifteenth constructions of the present invention. Constructional portions similar to those in the above-mentioned embodiment shown in FIGS. 6 and 7 are designated by the same reference numerals and an explanation thereof is omitted in the following description.

In FIGS. 10a and 10b, a rotating shaft 171 is formed by a base material 143 and a fixed shaft 172 as a bearing member is made of aluminum or an aluminum alloy. The rotating shaft 171 and the fixed shaft 172 constitute the dynamic pressure pneumatic bearing device. This dynamic pressure pneumatic bearing device is applied to a scanner explained in the above embodiment shown in FIGS. 6 and 7.

The fixed shaft 172 is vertically fitted and fixed to a central portion of a housing 111. Herringbone grooves 114, 115, recessed portions 116 to 118 and a band face 119 are formed on a bearing face 113. A magnet 133 is fixed to an upper end of the fixed shaft 172. A motor assembly 137, a mirror presser 123 and a polygon mirror 125 are attached to the rotating shaft 171 so that a rotating body 120 is constructed.

Predetermined composite plating processing is performed with respect to an inner circumferential surface 171a of the rotating shaft 171 and the bearing face 113 including the herringbone grooves 114 and 115 of the fixed shaft 172, etc. In this composite plating processing, the inner circumferential surface 171a and the bearing face 113 are dipped into a plating bath in which silicon carbide (SiC) is dispersed into a well-known electroless nickel plating liquid. Thus, a wear resisting film 174 having the dispersed silicon carbide (SiC) in the nickel plating is formed. The wear resisting film 174 is shown on only the rotating shaft 171 in FIG. 10a. This wear resisting film 174 prevents wearing powder from being generated by a contact between the inner circumferential face 121a of the rotating shaft 121 and the bearing face 113 of the fixed shaft 112. Further, the wear resisting film 174 prevents galling from being caused. A wear resisting material is preferably constructed by diamond in addition to silicon carbide (SiC). In particular, an outside diametrical surface of the fixed shaft 172 is finished by barrel or buffing processing to secure depths of the herringbone grooves 114 and 115. Further, burrs of the herringbone grooves 114 and 115, etc. are removed therefrom and edges of the herringbone grooves 114 and 115, etc. are rounded such that no galling is caused.

In this embodiment, operations and effects similar to those in the above embodiment shown in FIGS. 6 and 7 are obtained.

FIGS. 11a to 11d are processing views for explaining a manufacturing method of a groove for generating a dynamic pressure and having a sixteenth construction in accordance with another embodiment of the present invention. Each of FIGS. 11a to 11d partially shows a cross section of a main portion of a dynamic pressure pneumatic bearing device of the present invention as one example manufactured by the manufacturing method in this embodiment. In this embodiment, constructional portions similar to those in the above-mentioned embodiment shown in FIGS. 6 and 7 are designated by the same reference numerals and an explanation thereof is omitted in the following description.

In FIGS. 11a to 11d, a fixed shaft 182 as a bearing member is constructed by a base material 183 made of aluminum or an aluminum alloy. The rotating shaft 121 and the fixed shaft 182 constitute the dynamic pressure pneumatic bearing device. This dynamic pressure pneumatic bearing device is applied to a scanner explained in the above embodiment shown in FIGS. 6 and 7. The fixed shaft 182 is vertically fitted and fixed to a central portion of a housing 111. Herringbone grooves 114, 115, recessed portions 116 to 118 and a band face 119 are formed on a bearing face 113. A magnet 133 is fixed to an upper end of the fixed shaft 182.

The fixed shaft 182 is first formed in a columnar shape by cutting or grinding processing. Next, a mask 185 is formed by well-known patterning in portions corresponding to the herringbone grooves 114, 115 and the recessed portions 116 to 118 formed on the bearing face 113 of the fixed shaft 182. The mask 185 has the same shape as the herringbone grooves 114, 115 and the recessed portions 116 to 118. Next, the fixed shaft 182 is dipped into a plating bath in which Teflon particles (PTFE) are dispersed into a well-known electroless nickel plating liquid. Thus, predetermined composite plating processing as a first plating processing is performed with respect to the fixed shaft 182. A lubricating film 184a having the dispersed Teflon particles (PTFE) in the nickel plating is formed as a first plating film on a surface of the base material 183 on which no mask 185 is formed. After the mask 185 is next removed, the fixed shaft 182 is again dipped into the above plating bath so that composite plating processing as a second plating processing is similarly performed with respect to the fixed shaft 182. Thus, a lubricating film 184b having the same quality as the lubricating film 184a is formed as a second plating film on a surface of the lubricating film 184a and a surface of the base material 183 from which the mask 185 is removed. Next, an outside diameter of the lubricating film 184b is finally set to secure depths of the herringbone grooves 114 and 115. Thereafter, burrs of the herringbone grooves 114 and 115, etc. are removed therefrom by barrel or buffing processing and edges of the herringbone grooves 114 and 115, etc. are rounded such that wearing powder and galling are not caused.

Each of the lubricating films 184a and 184b may be formed by dispersing molybdenum disulfide or boron nitride instead of the Teflon particles (PTFE) into the above plating liquid. Further, the lubricating film 184a may be formed by single electroless nickel plating without dispersing a lubricant. The wear resisting film may be formed by dispersing silicon carbide (SiC) or diamond.

In this embodiment, in addition to the operations and effects obtained in the above embodiment shown in FIGS. 6 and 7, the lubricating films 184a and 184b are formed by the same electroless plating processing so that the herringbone grooves 114, 115 and the recessed portions 116 to 118 can be simultaneously manufactured and oxidation of the base material 183 can be simultaneously prevented. Accordingly, it is possible to reduce cost of the dynamic pressure pneumatic bearing device. Further, the herringbone grooves 114, 115, etc. are formed by the electroless nickel plating for easily adjusting a film thickness so that depths of the herringbone grooves are set with higher accuracy and bearing characteristics are further improved.

The above embodiments shown in FIGS. 6 to 11 relate to a dynamic pressure pneumatic bearing device in which a groove for generating a dynamic pressure is formed in the fixed bearing member formed in a columnar shape. However, the groove for generating a dynamic pressure may be formed on an inner circumferential face of the rotating shaft. Otherwise, the groove for generating a dynamic pressure may be formed on the rotating shaft formed in a columnar shape. Further, in addition to the dynamic pressure pneumatic bearing device constructed by the rotating shaft having a cylindrical hollow, the present invention can be also applied to a dynamic pressure pneumatic bearing device in which the groove for generating a dynamic pressure is formed on a columnar end face of the rotating shaft.

In accordance with each of seventh to twelfth constructions of the present invention, a lubricating film or a wear resisting film is formed in at least both contact portions in which the surface of the rotating shaft and the bearing face of the bearing member can come in contact with each other. The wear resisting film is constructed by a plating film having a dispersed wear resisting material. Accordingly, generation of wearing powder can be prevented even when the rotating shaft and the bearing member come in contact with each other at starting and stopping times of the dynamic pressure pneumatic bearing device, etc. Therefore, it is possible to prevent the rotating shaft from being locked. Further, the lubricating film or the wear resisting film of the same kind is formed so that a plant for forming these films is commonly used. Accordingly, the lubricating film or the wear resisting film can be formed with reduced cost. As a result, it is possible to provide a reliable dynamic pressure pneumatic bearing device with reduced cost.

In accordance with a ninth construction of the present invention, a plating film is formed on one of the rotating shaft and the bearing member on which the groove for generating a dynamic pressure is formed. An anodic oxide film is formed on the other of the rotating shaft and the bearing member. Accordingly, a lubricating film can be formed by the anodic oxide film without reducing a quality of the groove for generating a dynamic pressure.

In accordance with a thirteenth construction of the present invention, at least the rotating shaft is constructed by aluminum or an aluminum alloy. The surface of the rotating shaft opposed to the bearing face of the bearing member is constructed by stainless steel. Accordingly, the rotating shaft can be made light in weight and generation of galling can be prevented by metallic characteristics of this stainless steel. Further, the bearing face of the bearing member can be similarly constructed by stainless steel so that it is possible to prevent a change in clearance between the rotating shaft and the bearing member caused by an increase in temperature, thereby stabilizing bearing characteristics.

In accordance with a fourteenth construction of the present invention, a band face is formed on an inserting or inserted end tip side of the surface of the rotating shaft or the bearing face of the bearing member having the groove for generating a dynamic pressure thereon such that the band face has the same diameter as a diameter of the rotating shaft or the bearing member outside the groove for generating a dynamic pressure. Therefore, no edge of the rotating shaft or the bearing member comes into collision with the groove for generating a dynamic pressure. Accordingly, it is possible to prevent the rotating shaft from being locked by flaws, etc. caused by this collision.

In accordance with a fifteenth construction of the present invention, a plating film is formed after the groove for generating a dynamic pressure is formed. Accordingly, no fault is caused between portions formed and unformed by the plating film so that separation of the plating film can be prevented. Further, no base material is exposed so that oxidation of each of the rotating shaft and the bearing member can be prevented and a depth of the groove can be constantly maintained. Further, since the groove for generating a dynamic pressure is first formed, this groove can be easily formed by etching or rolling. A surface of the rotating shaft or the bearing member outside the groove for generating a dynamic pressure is finished after the plating film is formed. Accordingly, a depth of the groove can be set with high accuracy even when there is dispersion in the groove depth and no groove depth is equal to a set value. Edges of this groove can be simultaneously processed.

In accordance with a sixteenth construction of the present invention, a mask having the same shape as the groove for generating a dynamic pressure is first formed and a first plating film is formed outside this mask. After the mask is removed, a second plating film is formed on a surface of the rotating shaft or a bearing face of the bearing member including a surface of the first plating film. Accordingly, separation of the plating films can be prevented and a depth of the groove can be constantly maintained. Further, the depth of the groove for generating a dynamic pressure can be set with higher accuracy. Furthermore, plants for manufacturing the groove for generating a dynamic pressure and performing plating processings can be commonly used so that the groove for generating a dynamic pressure can be formed with reduced cost.

Many widely different embodiments of the present invention may be constructed without departing from the spirit and scope of the present invention. It should be understood that the present invention is not limited to the specific embodiments described in the specification, except as defined in the appended claims.

What is claimed is:

1. A dynamic pressure pneumatic bearing device comprising:

a rotating shaft made of aluminum or aluminum alloy;

a bearing member made of aluminum or aluminum alloy and having a bearing face opposed to a surface of the rotating shaft and separated from this surface with a predetermined clearance;

a groove disposed on the surface of the rotating shaft or the bearing face of the bearing member for generating a dynamic pressure;

a lubricating film formed on at least both contact face portions on which the surface of the rotating shaft and the bearing face of the bearing member can come in contact with each other; and a motor fixed to the rotating shaft for rotating the rotating shaft and including a magnet, said magnet having a balance correcting groove formed therein to correct an imbalance in said magnet.

2. A dynamic pressure pneumatic bearing device as claimed in claim 1, wherein said lubricating film is constructed by any one of Teflon, molybdenum disulfide and boron nitride.

3. A dynamic pressure pneumatic bearing device as claimed in claim 1, wherein a plating film having a lubricating property is formed on one of the surface of the rotating shaft and the bearing face of the bearing member on which said groove for generating a dynamic pressure is formed; and an anodic oxide film having a lubricating property is formed on the other of the surface of the rotating shaft and the bearing face of the bearing member.

4. A dynamic pressure pneumatic bearing device as claimed in claim 3, wherein said lubricating property is provided by any one of polyetrafluoroethylene molybdenum disulfide and boron nitride.

5. A dynamic pressure pneumatic bearing device comprising:

a rotating shaft made of aluminum or aluminum alloy;

a bearing member made of aluminum or aluminum alloy and having a bearing face opposed to a surface of the rotating shaft and separated from this surface with a predetermined clearance;

a groove disposed on the surface of the rotating shaft or the bearing face of the bearing member for generating a dynamic pressure;

a plating film formed by dispersing a wear resisting and lubricating material on at least both contact face portions on which the surface of the rotating shaft and the bearing face of the bearing member can come in contact with each other; and a motor fixed to the rotating shaft for rotating the rotating shaft and including a magnet, said magnet having a balance correcting groove formed therein to correct an imbalance in said magnet.

6. A dynamic pressure pneumatic bearing device as claimed in claim 5, wherein said wear resisting material comprises any one of silicon carbide and diamond.

7. A dynamic pressure pneumatic bearing device comprising:

a rotating shaft made of aluminum or aluminum alloy;

a bearing member made of aluminum or aluminum alloy and having a bearing face opposed to a surface of the rotating shaft and separated from this surface with a predetermined clearance; and a groove disposed on the bearing face of the bearing member for generating a dynamic pressure;

a motor fixed to the rotating shaft for rotating the rotating shaft and including a magnet, said magnet having a balance correcting groove formed therein to correct an imbalance in said magnet;

the bearing member being in the shape of a column having a predetermined diameter, and the rotating shaft being in the shape of a hollow cylinder having a predetermined diameter to receive the bearing member, a thin-walled pipe of stainless steel being fixed onto an inner circumferential surface of the rotating shaft.

8. A dynamic pressure pneumatic bearing device comprising:

a rotating shaft made of aluminum or aluminum alloy;

a bearing member made of aluminum or aluminum alloy and having a bearing face opposed to a surface of the rotating shaft and separated from this surface with a predetermined clearance; and a groove disposed on the surface of the rotating shaft or the bearing face of the bearing member for generating a dynamic pressure;

a motor fixed to the rotating shaft for rotating the rotating shaft and including a magnet, said magnet having a balance correcting groove formed therein to correct an imbalance in said magnet;

the dynamic pressure pneumatic bearing device being constructed such that one of the rotating shaft and the bearing member is formed in a columnar shape having a predetermined diameter;

a cylindrical hollow having a predetermined diameter is formed in the other of the rotating shaft and the bearing member to receive said one of the rotating shaft and the bearing member;

a band face having a predetermined width is formed on an inserting or inserted end tip side of the surface of the bearing member having the groove for generating a dynamic pressure thereon such that the band face has the same diameter as a diameter of the rotating shaft or the bearing member outside the groove for generating a dynamic pressure; and a recessed band portion is provided adjacent to the band face and having the same depth as the groove for generating a dynamic pressure, said recessed band portion communicating with said groove.

* * * * *